UNITED STATES PATENT OFFICE.

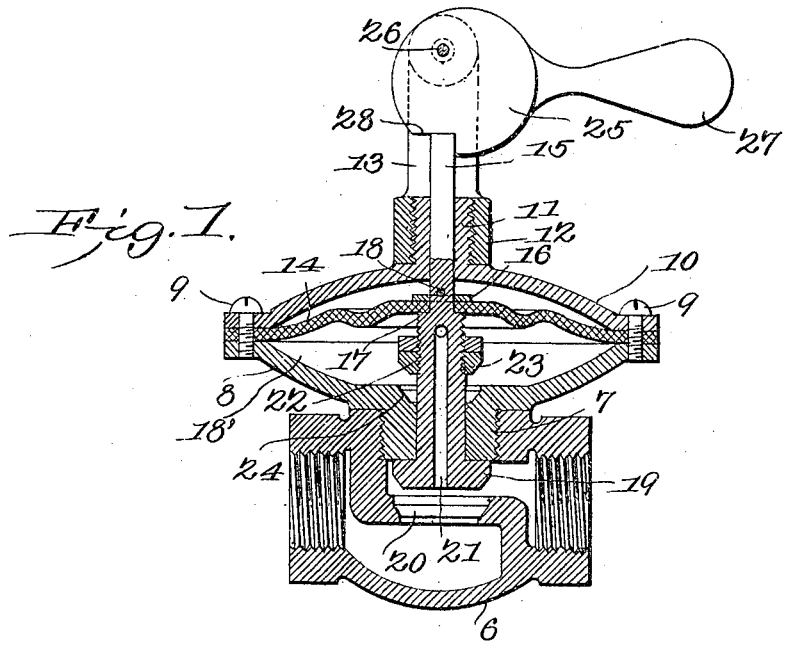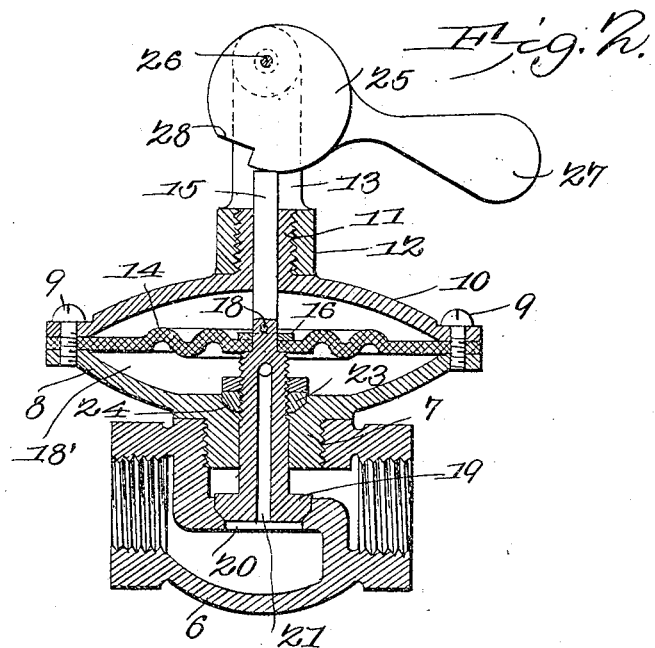

HOMER W. FISKE, OF MILAN, OHIO.

AUTOMATIC GAS-REGULATOR.

No. 807,813.　　　Specification of Letters Patent.　　　Patented Dec. 19, 1905.

Application filed July 6, 1905. Serial No. 268,459.

*To all whom it may concern:*

Be it known that I, HOMER W. FISKE, a citizen of the United States, residing at Milan, in the county of Erie and State of Ohio, have invented a new and useful Automatic Gas-Regulator, of which the following is a specification.

This invention relates to automatic fluid-pressure regulators, and has for its object to provide an inexpensive, durable, and efficient device of this character which will automatically cut off the flow of gas from the supply-pipe or gas-main should the pressure in the latter be materially reduced or the supply of gas temporarily cut off.

A further object of the invention is to provide means for automatically locking the valve in closed position, so that any subsequent increase in the gas-pressure will not effect the opening of said valve.

With these and other objects in view the invention consists in the construction and novel combination and arrangement of parts hereinafter fully described, illustrated in the accompanying drawings, and pointed out in the claims herewith appended, it being understood that various changes in form, proportions, and minor details of construction may be resorted to without departing from the principle or sacrificing any of the advantages of the invention.

In the accompanying drawings, forming a part of this specification, Figure 1 is a longitudinal sectional view of an automatic gas-pressure regulator constructed in accordance with my invention, showing the valve in open position. Fig. 2 is a similar view showing the valve closed.

Similar numerals of reference indicate corresponding parts in both figures of the drawings.

The improved valve, which may be positioned in a cellar or other convenient portion of a building, is adapted to be connected to the gas-supply pipe at a point adjacent the meter.

The device consists of a valve-casing 6, preferably of the globe-valve type, as shown, and in which is threaded the reduced extension 7 of a substantially elliptical housing 8. The housing 8 is preferably formed in two sections fastened together in any suitable manner, as by screws or bolts 9, the upper section 10 being formed with a similar threaded extension 11, adapted to engage a correspondingly-threaded collar 12, carrying a pair of spaced uprights or standards 13. Interposed between the adjacent edges of the housing-sections and retained in position by the bolts or screws 9 is a flexible diaphragm 14, having an opening formed in the central portion thereof, through which passes the stem 15 of a double-seated controlling-valve. The diaphragm, which may be constructed of leather, metal, or other suitable material, is preferably formed of corrugated sheepskin and is secured to the valve-stem by means of a collar 16, which bears against the diaphragm and clamps the latter in engagement with an annular shoulder 17, formed on the stem, the several parts being held together by a transverse locking-pin 18. One end of the stem 15 terminates in a valve 19, which drops by gravity into engagement with its seat 20 in the casing 6 when the gas-pressure in the supply pipe or main is reduced or temporarily cut off and in which position it will be locked in the manner hereinafter described, so as to prevent further flows of gas to the burner when the gas-pressure increases. Extending longitudinally of the valve-stem is an opening or passage 21, through which the gas flows from the supply-pipe into the lower chamber or compartment 18' of the housing 8, thereby elevating the diaphragm and holding the valve 19 open so long as the gas-pressure in the supply-pipe remains constant. The intermediate portion of the valve-stem is threaded, as indicated at 22, for the reception of an auxiliary valve 23, which is vertically adjustable on said valve-stem and engages its seat 24 in the lower section of the housing when the pressure in the supply-pipe is reduced, thereby effectively preventing the escape of gas from the compartment 18' to the burners.

As a means for locking the valves 19 and 23 in closed position there is provided a lever 25, eccentrically pivoted, as indicated at 26, between the uprights or standards of the collar 12, said lever being provided with a weighted handle 27 and having its circular body portion provided with a notch or recess 28, adapted to movably engage the upper end of the valve-stem, as clearly shown in Fig. 1 of the drawings. When the gas-pressure in the supply-pipe is for any reason reduced to such an extent as to cause the lights in the house to go out, the valve will drop by gravity to closed position, thereby releasing the valve-stem from the notch or recess and causing the eccentric to bear upon the top of the stem, as clearly shown in Fig. 2, and in which position the main and auxiliary valves will be locked against further movement until the valve-stem is released by elevating the eccentric or locking lever manually. It will thus be seen that the valve is automatically closed by a temporary cutting off or reduction in the gas-supply to the valve-casing and that the gas cannot escape to the burners until the valve has been opened manually in the manner before stated.

Attention is here called to the fact that by having the pressure-regulating mechanism carried by the sectional housing the device may be quickly attached to an ordinary globe-valve casing by merely removing the valve and bushing and screwing the threaded extension of the housing in said casing. It will also be observed that the auxiliary valve dispenses with the use of packing and the like around the valve-stem, thereby permitting the valve-stem to fit loosely in the housing and to move freely to open and closed position without unnecessary friction.

Having thus described the invention, what is claimed is—

1. In an automatic fluid-pressure regulator, a valve-casing, a housing carried by the casing and forming a fluid-chamber, a valve within the casing and having its stem passing through the fluid-chamber, a diaphragm extending across said chamber and connected to the valve-stem, means for permitting the flow of fluid from the casing through the valve-stem to the fluid-chamber for actuating the valve, and means for locking the valve in closed position.

2. In an automatic fluid-pressure regulator, a valve-casing, a housing detachably secured to the casing and forming a fluid-chamber, a diaphragm extending across said chamber, a valve seated within the casing and having its stem passing through the fluid-chamber and provided with a longitudinal passage to permit the flow of fluid from the casing to said chamber for actuating the valve, and means for locking the valve in closed position.

3. In an automatic fluid-pressure regulator, a valve-casing, a housing carried by the casing and forming a fluid-chamber, a valve-stem extending through said chamber and provided with main and auxiliary valves seated within the valve-casing and housing, respectively, a diaphragm extending across the fluid-chamber and secured to the valve-stem, said valve-stem being provided with a longitudinal passage to permit the flow of fluid from the valve-casing to the chamber for actuating said valves, and means engaging said valve-stem for automatically locking the valves in closed position.

4. In an automatic fluid-pressure regulator, a valve-casing, a housing detachably secured thereto and forming a fluid-chamber, a valve-stem extending through said chamber and provided with an annular shoulder, a diaphragm extending across the fluid-chamber and engaging said annular shoulder, a clamping-collar bearing upon the diaphragm above said shoulder, main and auxiliary valves carried by the valve-stem and seated in the casing and housing, respectively, said valve-stem being provided with a longitudinal passage to permit the flow of liquid from the valve-casing to said chamber for actuating the valves, and a locking-lever pivoted to the housing and adapted to engage the valve-stem for locking the valves in closed positions.

5. In an automatic fluid-pressure regulator, a valve-casing, a housing detachably secured thereto and forming a fluid-chamber, spaced uprights secured to the housing, a valve-stem guided between said uprights and provided with main and auxiliary valves seated in the valve-casing and housing, respectively, said valve-stem being formed with a longitudinal passage forming a source of communication between the valve-casing and fluid-chamber, a diaphragm extending across the fluid-chamber and secured to the valve-stem, and a locking-lever eccentrically pivoted between the uprights and provided with a notch for engaging the valve-stem, said lever being adapted to automatically lock the valves in closed position.

6. In an automatic fluid-pressure regulator, a valve-casing, a sectional housing forming a fluid-chamber and provided with oppositely-disposed reduced threaded extensions one of which detachably engages the valve-casing, a collar engaging the opposite extension and provided with a pair of spaced uprights, a valve-stem guided between said uprights and provided with a main and an auxiliary valve seated in the valve-casing and housing, respectively, said valve being provided with a longitudinal passage forming a source of communication between the valve-casing and fluid-chamber, a diaphragm extending across the fluid-chamber and secured to the valve-stem for actuating the valve, and a locking-lever eccentrically pivoted between the spaced uprights and adapted to engage the valve-stem for locking the valves in closed position.

In testimony that I claim the foregoing as my own I have hereto affixed my signature in the presence of two witnesses.

HOMER W. FISKE.

Witnesses:
MALTBY SMITH,
GEORGE G. SCHAEFFER.